(12) United States Patent
Wang et al.

(10) Patent No.: US 8,794,520 B2
(45) Date of Patent: Aug. 5, 2014

(54) METHOD AND APPARATUS FOR OPERATING INDICIA READING TERMINAL INCLUDING PARAMETER DETERMINATION

(75) Inventors: Ynjiun P. Wang, Cupertino, CA (US); Shulan Deng, San Jose, CA (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 264 days.

(21) Appl. No.: 12/242,244

(22) Filed: Sep. 30, 2008

(65) Prior Publication Data

US 2010/0078477 A1 Apr. 1, 2010

(51) Int. Cl.
*G06K 7/10* (2006.01)

(52) U.S. Cl.
USPC ..................... 235/454; 235/472.01

(58) Field of Classification Search
USPC ......................... 235/454, 462, 472
See application file for complete search history.

(56) References Cited

U.S. PATENT DOCUMENTS

| | | | |
|---|---|---|---|
| 5,155,343 A * | 10/1992 | Chandler et al. | 235/462.09 |
| 7,227,117 B1 | 6/2007 | Lackemann et al. | |
| 7,240,844 B2 | 7/2007 | Zhu et al. | |
| 7,261,238 B1 | 8/2007 | Carlson et al. | |
| 7,270,273 B2 * | 9/2007 | Barber et al. | 235/462.25 |
| 2001/0038037 A1 * | 11/2001 | Bridgelall et al. | 235/462.14 |
| 2002/0170970 A1 | 11/2002 | Ehrhart | |
| 2004/0013315 A1 | 1/2004 | Li et al. | |
| 2005/0001035 A1 | 1/2005 | Hawley et al. | |
| 2006/0274171 A1 | 12/2006 | Wang | |
| 2007/0023526 A1 | 2/2007 | Moore et al. | |
| 2007/0284448 A1 | 12/2007 | Wang | |
| 2009/0078773 A1 | 3/2009 | Carlson et al. | |
| 2009/0108071 A1 | 4/2009 | Carlson | |

OTHER PUBLICATIONS

European Search Report of EP Application No. 09 17 4699, Dec. 14, 2009, (2 pages).
United States Patent and Trademark Office, Office action for U.S. Appl. No. 12/263,243, dated Aug. 20, 2010, (22 pages).

* cited by examiner

*Primary Examiner* — Michael G Lee
*Assistant Examiner* — Tabitha Chedekel
(74) *Attorney, Agent, or Firm* — Additon, Higgins, Pendleton & Ashe, P.A.

(57) ABSTRACT

A method for operating an indicia reading terminal is provided wherein image information can be processed for determining a location of a decodable indicia representation for a certain frame of image data, the result of the processing can be utilized for determination of an imaging parameter, the imaging parameter can be utilized for capture of a subsequent frame and the subsequent frame can be subject to image processing.

27 Claims, 6 Drawing Sheets

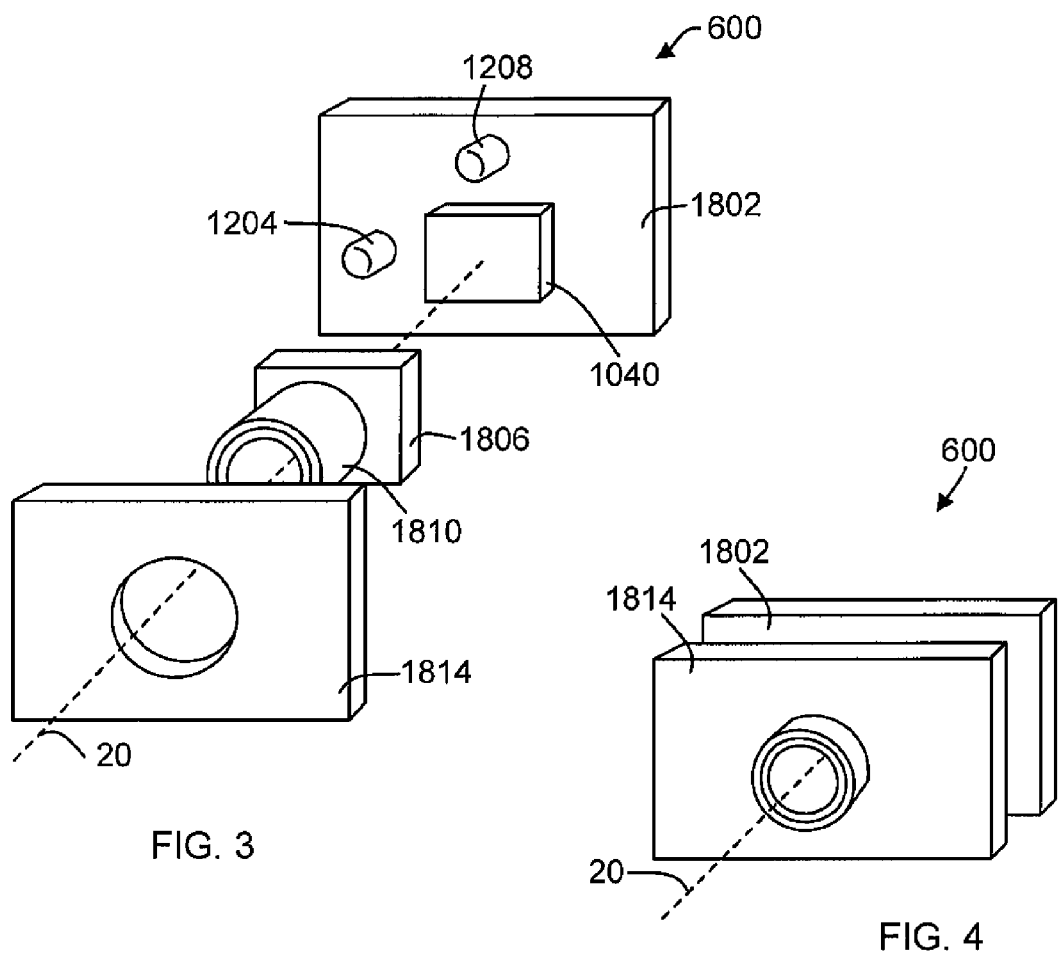
FIG. 3
FIG. 4
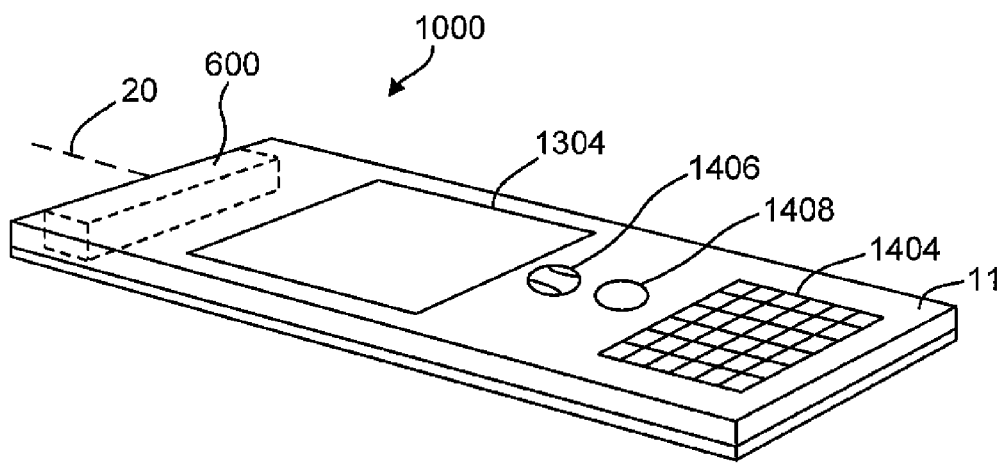
FIG. 5

US 8,794,520 B2

METHOD AND APPARATUS FOR OPERATING INDICIA READING TERMINAL INCLUDING PARAMETER DETERMINATION

FIELD OF THE INVENTION

The invention relates to registers in general and in particular to an optical based register for reading of decodable indicia.

BACKGROUND OF THE INVENTION

It is known in the art of indicia reading terminals (e.g., bar code readers) to process a plurality of successively captured setup frames of image data prior to subjecting a captured frame of image data to a decode attempt. In typical operation of a commercially available bar code reader, a plurality of setup frames may be successively captured and subject to processing for exposure period parameter determination. For determining an exposure parameter, a set of pixel values of a frame corresponding to a predetermined spatial distribution pattern (e.g., evenly distributed or weighted toward centered pixel portions) may be averaged for determination of a frame white level. The white level determined using pixel values taken from the predetermined distribution pattern is compared to a target white level. The exposure period may be increased if the white level is lower than the target level, and decreased if the white level is higher than the target white level.

The prior art approach to parameter development has been observed to result in misreads and long trigger to read (TTR) times in indicia reading terminals. Misreads are particularly common using the prior art approach where a captured image representation includes large white areas outside of a decodable indicia region of an image representation, or large dark areas outside of a decodable indicia region of an image representation.

SUMMARY OF THE INVENTION

A method for operating an indicia reading terminal is provided wherein image information can be processed for determining a location of a decodable indicia representation for a certain frame of image data, the result of the processing can be utilized for determination of an imaging parameter, and the imaging parameter can be utilized for capture of a subsequent frame.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 3 is an exploded perspective view of an imaging module carrying a subset of circuits as shown in FIG. 2;

FIG. 4 is an assembled view of the imaging module of FIG. 3;

FIG. 5 is a perspective view of an indicia decoding terminal incorporating an imaging module as shown in FIGS. 3 and 4;

DETAILED DESCRIPTION OF THE INVENTION

Figure 1:
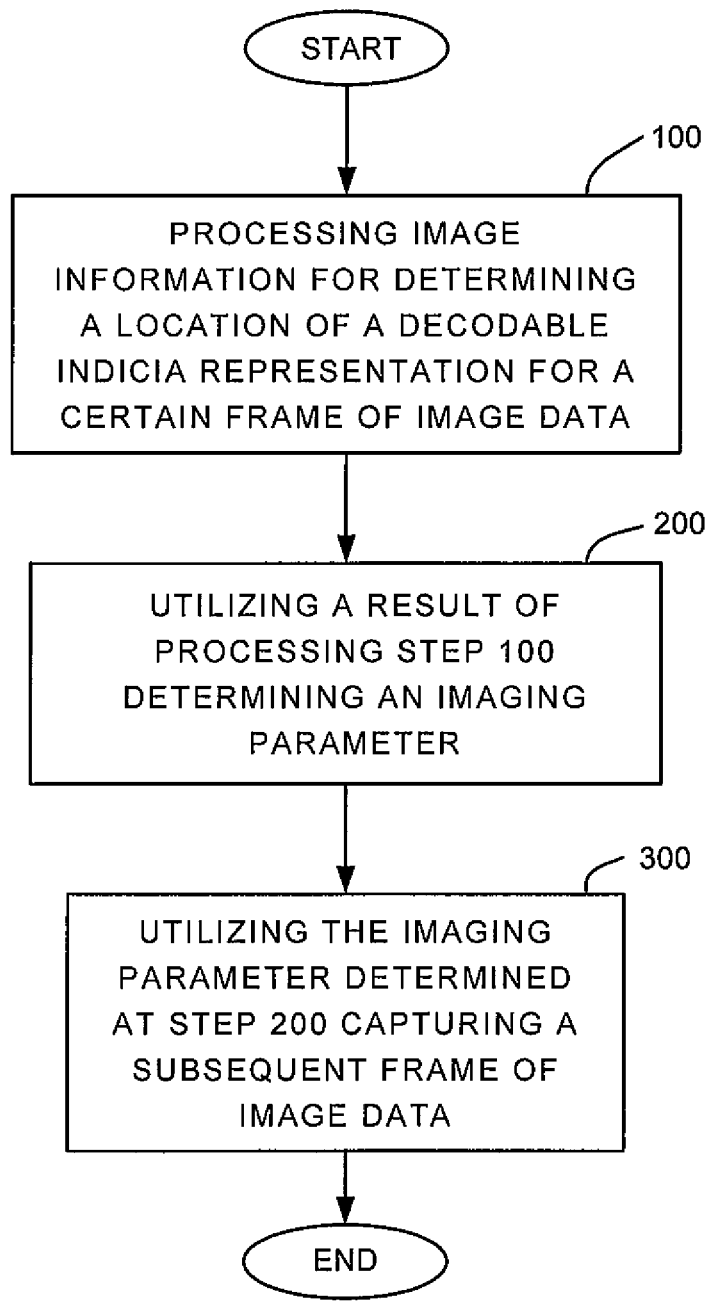
FIG. 1 is a flow diagram illustrating a method for operation with use of an indicia reading terminal.

Referring to the flow diagram of FIG. 1, a method is provided in one example which includes the steps of at block 100 processing image information for determining a location of a decodable indicia representation for a certain frame of image data; at block 200 utilizing a result of the processing for determining an imaging parameter; and at block 300 utilizing the imaging parameter for capture of a subsequent frame. The method provides for fast capture of a frame of image data that can be processed for decoding even in cases where a scene subject to image capture has large white areas or large dark areas outside of a location of a decodable indicia. The method also provides for fast capture of a frame of image data of high visual quality. In one embodiment, the method can be executed a number of times in succession (each time relative to a new frame in a succession of frames) in response to activation of a trigger signal until a frame is successfully decoded or until a time that a trigger signal is deactivated.

Figure 2:
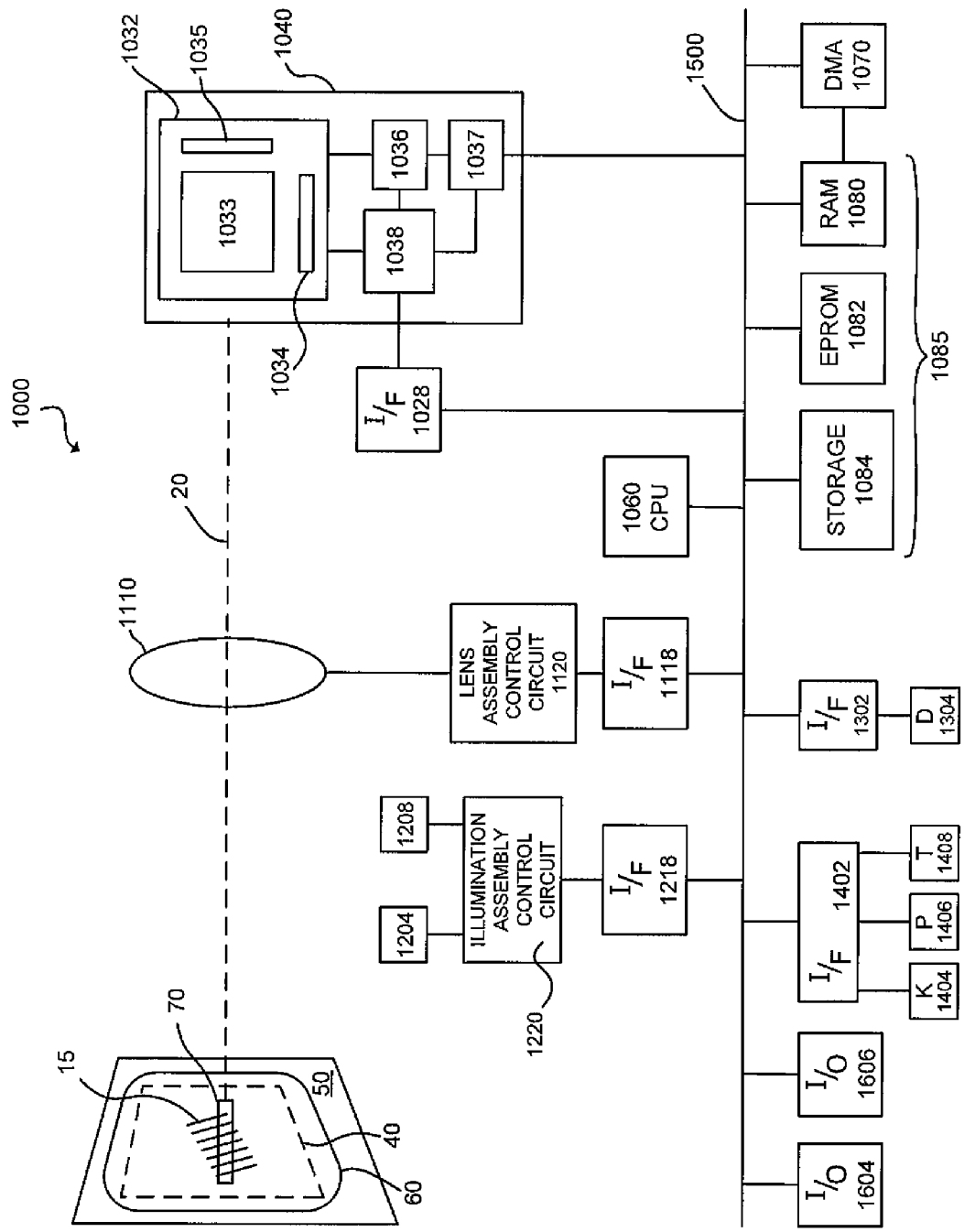
FIG. 2 is a block diagram illustrating an exemplary hardware platform for executing a method described herein.

An exemplary hardware platform for carrying out the described method is shown and described with reference to the block diagram of FIG. 2. Indicia reading terminal 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036, and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. In one example, image sensor integrated circuit 1040 can be provided by an MT9V022 image sensor integrated circuit available from Micron Technology, Inc. In another example, image sensor integrated circuit 1040 can incorporate a Bayer pattern filter. In such an embodiment, CPU 1060 prior to subjecting a frame to further processing can interpolate pixel values intermediate of green pixel values for development of a monochrome frame of image data.

In the course of operation of terminal 1000 image signals can be read out of image sensor 1032, converted and stored into a system memory such as RAM 1080. A memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include central processing unit (CPU) 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Referring to further aspects of terminal 1000, terminal 1000 can include an imaging lens assembly 1110 for focusing an image of a decodable indicia located within a field of view 40 on a substrate 50 onto image sensor array 1033. Imaging light rays can be transmitted about imaging axis 20. Lens assembly 1110 can be adapted to be capable of multiple focal lengths and multiple best focus distances.

Terminal 1000 can also include a light source bank 1204 for generating an illumination pattern 60 substantially corresponding to a field of view 40 of terminal 1000 and an aiming pattern light source bank 1208 for generating an aiming pattern 70 on substrate 50. In use, terminal 1000 can be oriented by an operator with respect to a substrate 50 bearing decodable indicia 15 in such manner that aiming pattern 70 is projected on a decodable indicia 15. In the example of FIG. 2, decodable indicia 15 is provided by a 1D bar code symbol. Decodable indicia could also be provided by 2D bar code symbols or optical character recognition (OCR) characters. Each of illumination pattern light source bank 1204 and aiming pattern light source bank 1208 can include one or more light sources. Lens assembly 1110 can be controlled with use of lens assembly control circuit 1120 and the illumination assembly comprising light source bank 1204 and aiming pattern light source bank 1208 can be controlled with use of illumination assembly control circuit 1220. Lens assembly control circuit 1120 can send signals to lens assembly 1110 e.g., for changing a focal length and/or a best focus distance of lens assembly 1110. Illumination assembly control circuit 1220 can send signals to light source bank 1204 e.g., for changing a level of illumination output by light source bank 1204.

Terminal 1000 can also include a number of peripheral devices such as display 1304 for displaying such information as image frames captured with use of terminal 1000, keyboard 1404, pointing device 1406, and trigger 1408 which may be used to make active a trigger signal for activating frame readout and/or certain decoding processes. Terminal 1000 can be adapted so that activation of trigger 1408 activates trigger signal 2016 and initiates a decode attempt.

Terminal 1000 can include various interface circuits for coupling various of the peripheral devices to system address/data bus (system bus) 1500, for communication with CPU 1060 also coupled to system bus 1500. Terminal 1000 can include interface circuit 1028 for coupling image sensor timing and control circuit 1038 to system bus 1500, interface circuit 1118 for coupling lens assembly control circuit 1120 to system bus 1500, interface circuit 1218 for coupling illumination assembly control circuit 1220 to system bus 1500, interface circuit 1302 for coupling display 1304 to system bus 1500, and interface circuit 1402 for coupling keyboard 1404, pointing device 1406, and trigger 1408 to system bus 1500.

In a further aspect, terminal 1000 can include one or more I/O interfaces 1604, 1606 for providing communication with external devices (e.g., a cash register server, a store server, an inventory facility server, a peer terminal 1000, a local area network base station, a cellular base station). I/O interfaces 1604, 1606 can be interfaces of any combination of known computer interfaces, e.g., Ethernet (IEEE 802.3), USB, IEEE 802.11, Bluetooth, CDMA, GSM.

Referring to FIGS. 3 and 4, an imaging module 600 for supporting components of terminal 1000 can include image sensor integrated circuit 1040 disposed on a printed circuit board 1802 together with illumination pattern light source bank 1204 and aiming pattern light source bank 1208 each shown as being provided by a single light source. Imaging module 600 can also include containment 1806 for image sensor integrated circuit 1040, and housing 1810 for housing lens assembly 1110. Imaging module 600 can also include optical plate 1814 having optics for shaping light from bank 1204 and bank 1208 into predetermined patterns. Imaging module 600 can be disposed in a hand held housing 11, an example of which is shown in FIG. 5. Disposed on hand held housing 11 can be display 1304, trigger 1408, pointing device 1406, and keyboard 1404.

A generic description of a method having been described with reference to the flow diagram of FIG. 1, specific examples of the various method blocks are now described.

Figure 6:
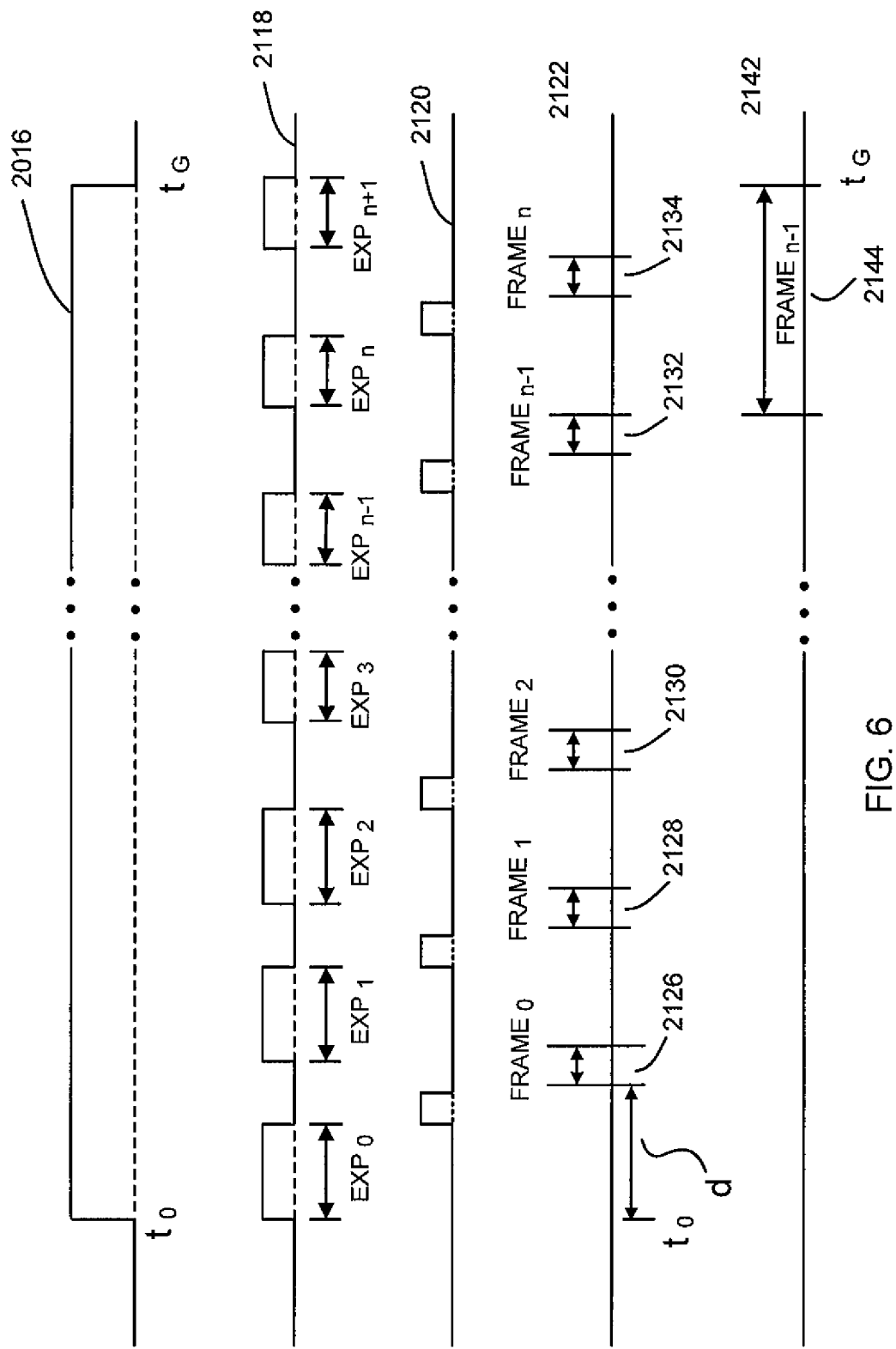
FIG. 6 is timing diagram illustrating exemplary operation of an indicia reading terminal.

A specific example of step 100 (processing image information for determining a location of a decodable indicia) is described with reference to the timing diagram of FIG. 6 and the image map diagram of FIG. 7.

At block 100, terminal 1000 in one embodiment, can process image information for determining a location of decodable indicia by completing capturing of a frame of image data by storage of a frame into RAM 1080, where it is addressable by CPU 1060 and subjecting the stored frame of image data to processing. An exemplary method for capturing image data for processing by CPU 1060 is described with reference to the timing diagram of FIG. 6. At time to trigger 1408 may be actuated to make active a trigger signal 2016 which may remain active until the earlier of trigger 1408 being released or a predetermined number of (e.g., 1) decodable indicia being successfully decoded (in the example of the timing diagram of FIG. 6, trigger signal 2016 is automatically deactivated at time, $t_G$, when an indicia representation is successfully decoded). Terminal 1000 can be adapted so that terminal 1000 continuously captures and processes a succession of frames for a time that trigger signal 2016 remains active. Terminal 1000 can be adapted so that in response to a trigger signal being made active, an exposure control timing pulse signal 2118 is applied to image sensor 1032 to expose pixels of image sensor array 1033. After a trigger signal is made active, there can be a succession of exposure periods $Exp_0$, $Exp_1$, $Exp_2$, $Exp_3$, . . . each corresponding to a frame in a succession of frames, and each defined by a pulse of exposure control signal 2118.

Following each exposure period $Exp_0$, $Exp_1$, $Exp_2$, $Exp_3$ . . . image information in the form of voltage signals can be read out from image sensor 1032. The readout of image information from image sensor 1032 can be in response to applications of readout control pulses of readout control signal 2120 as shown in the timing diagram of FIG. 6. Image information which has been subject to conversion by analog to digital converter 1037 can be routed into memory 1085 via DMA unit 1070 where it is available for processing by CPU 1060. Referring to the timing diagram of FIG. 6, time plot 2122 indicates the times within which CPU 1060 can process, for determining a location of a decodable indicia, a certain frame of image data out of a series of frames captured in response to activation of a trigger signal 2016. It is seen from time plot 2122 that processing by CPU 1060 for determining a location of a decodable indicia as part of block 100 can be carried out iteratively for each frame of a succession of frames. Because of processing delays, CPU 1060 may not commence processing an initial frame, frame$_0$, until during period 2126, a delay of time "d" after a trigger signal is made active at time t$_0$. Within processing periods 2126, 2128, 2130, 2132, 2134, CPU 1060 can carry out further processing with respect to a current frame, e.g., determining an imaging parameter (block 200) and determining a frame's quality as will be described herein.

A succession of frames of image data that can be captured and subject to the described processing can be full frames (including pixel values corresponding to more than about 80% of pixels of image sensor 1032). A succession of frames of image data that can be captured and subject to the described processing (e.g., context processing, parameter determination, decoding) can also be "windowed frames" comprising pixel values corresponding to less than about 80%, and in some cases less than about 50% and in some cases less than 10% of pixels of image sensor 1032. A succession of frames of image data that can be captured and subject to the described processing can also comprise a combination of full frames and windowed frames. A full frame can be captured by selectively addressing for readout pixels of image sensor 1032 corresponding to the full frame. A windowed frame can be captured by selectively addressing for readout pixels of image sensor 1032 corresponding to the windowed frame.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame.

After a frame of image data is captured at block 100 by storage into RAM 1080, the frame of image data can be subject to context detection for determining a location of a decodable indicia representation. At block 100, for context detection, a frame of image data can be sampled along a plurality of sampling paths. A representation of a frame of image data is shown in FIG. 7 where various pixel positions corresponding to pixels of image sensor 1032 are represented in a matrix array of pixel positions. A plurality of sampling paths in one example can comprise a plurality of horizontal sampling paths 2202, 2204, 2206, 2208, 2210, 2212, 2214, comprising pixel values along spaced apart rows of pixels. A plurality of sampling paths can also include a plurality of vertical sampling paths 2226, 2228, 2230, 2232, 2234, 2236, 2238, 2240, 2242, 2244 comprising pixel values of spaced apart columns of pixel values. Each sampling path 2202, 2204, 2206, 2208, 2210, 2212, 2214, 2226, 2228, 2230, 2232, 2234, 2236, 2238, 2240, 2242, and 2244 can comprise pixel values corresponding to a set of pixel positions, where each pixel position is positionally adjacent to one or two pixel positions of the set.

Further, for processing a frame of image data for context detection, an autocorrelation function can be applied to sampled image data. In one example, an autocorrelation function can be applied utilizing image data of the sampling path. An autocorrelation function for a sampling path can comprise the formula $$S_{path} = \Sigma (I_n - I_{n-1})^2 \quad \text{Equation 1}$$

where $I_n$ is the pixel value at a certain pixel position n, of a path, and $I_{n-1}$ is a pixel value at a pixel position adjacent to the $n^{th}$ pixel position. For reduction of clock cycles required for performing the calculation of Equation 1, an approximation of the result of Equation 1 can be carried out by executing the calculation:

$$S_{path} = \Sigma |I_n - I_{n-1}| \quad \text{Equation 2}$$

From the formulas of Equation 1 and Equation 2, it is seen that sampling paths that intersect representations of decodable indicia will likely include higher autocorrelation scores than those that do not include decodable indicia representations (where no decodable indicia representation is included along a sampling path and the sampling path comprises similar valued pixel values, the autocorrelation function will be relatively low; however, high autocorrelation scores will result when a sampling path intersects a decodable indicia representation including a plurality of dark/light transitions). Accordingly, a high autocorrelation score for a sampling path will serve as an indication that a sampling path is likely to have intersected a decodable indicia representation.

Further at block 100, high autocorrelation scores (those indicating the inclusion of a decodable indicia representation) can be discriminated from low autocorrelation scores (those indicating the absence of a decodable indicia representation) along a sampling path. For performance of such discrimination, the sampling path or paths yielding the highest autocorrelation score(s) can be selected as the path or paths indicating that a decodable indicia is represented. For example, the horizontal sampling path yielding the highest autocorrelation score in the horizontal direction, and the vertical sampling path yielding the highest autocorrelation score in the vertical direction can be selected as paths that indicate that a decodable indicia is represented. Also, autocorrelation scores can be subject to a threshold. Those scores above a threshold can be regarded as indicating that image data utilized for the calculation includes a decodable indicia representation and those under a threshold can be regarded as indicating that image data utilized for the calculation does not include a decodable indicia representation. Such a threshold can be predetermined and fixed or can be variable and dynamically determined.

Accordingly, in one specific example described with reference to the flow diagram of FIG. 1, a location of a decodable indicia in a frame of image data can be determined by subjecting a plurality of horizontal and vertical sampling paths to an autocorrelation function, and selecting the sampling paths yielding the highest autocorrelation score(s) as the paths representing a decodable indicia.

Figure 7:
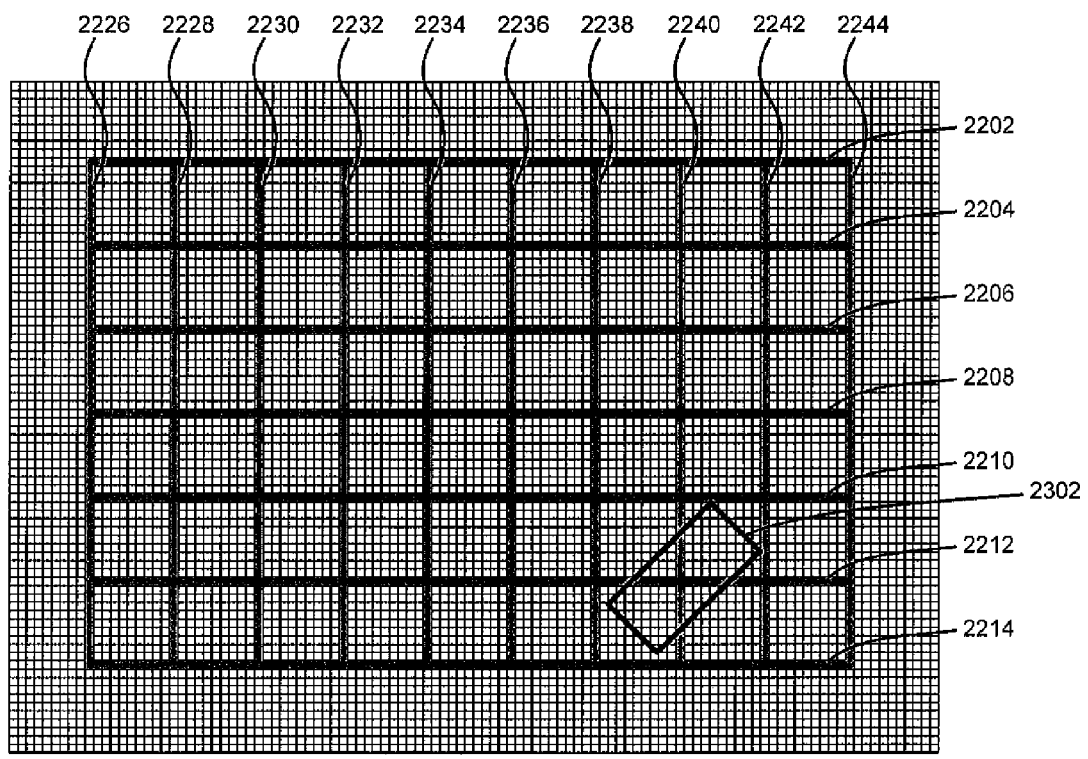
FIG. 7 is an image map indicating a set of pixel positions corresponding to image sensor pixels and exemplary sampling paths for sampling data that can be read from an image representation. For purposes of illustrating features of an indicia reading terminal, the resolution of the frame of image data illustrated in FIG. 7 is presented in lower resolution than that which will be observed in operation.

In the example of FIG. 7 where decodable indicia representation 2302 is located at the location shown, CPU 1060 after calculating autocorrelation scores for each sampling path 2202, 2204, 2206, 2208, 2210, 2212, 2214, 2226, 2228, 2230, 2232, 2234, 2236, 2238, 2240, 2242, and 2244 can determine that path 2212 has the highest autocorrelation score out of the horizontal sampling paths, that path 2240 has the highest autocorrelation score out of the vertical sampling paths, and can select paths 2212 and 2240 as the paths including image data representing a decodable indicia.

In one embodiment, CPU 1060 after calculating autocorrelation scores for various sampling paths can further process path data for further discrimination of a location of a decodable indicia representation along a path.

In one embodiment, selected paths selected as yielding the highest autodiscrimination scores and indicating an intersection of decodable indicia representation can be subjected to processing for classifying path image data as either background image data or decodable indicia image data. In one example, for performance of such classification, terminal 1000 can binarize image data along each selected sampling path. For binarization, path pixel value image data can be compared to a threshold and all pixel values below the threshold can be classified as decodable indicia, and all pixel values above the threshold can be classified as background. A mean value of a path can be selected as a threshold, or the threshold can be selected according to $T=\frac{1}{2}(I_{max}+I_{min})$. In another example, Otsu's algorithm can be utilized for determination of the threshold. Segments of a sampling path characterized by a high density of decodable indicia can be classified as decodable indicia segments. Image data at a location determined to include a decodable indicia representation can include image data defining dark portions of a decodable indicia and image data at pixel positions about such indicia.

Referring again to the flow diagram of FIG. 1, terminal 1000 at block 200 utilizes a result of the processing at block 100 to determine an imaging parameter.

In one example, terminal 1000 at block 200 can determine an imaging parameter in the form of an exposure period parameter. In an example of processing block 200, autocorrelation scores which may be calculated at block 100 may be utilized for determining an exposure period parameter. In other embodiments, other imaging parameters, e.g., gain input into amplifier 1036, or an illumination level parameter for input to light source bank 1204 can be controlled instead of or in addition to an exposure period.

Terminal 1000 at block 200 can calculate a white level for a frame selectively utilizing pixel values from sampling areas having autocorrelation scores determined to indicate that a decodable indicia is represented. For example, terminal 1000 can selectively utilize sampling paths yielding the highest autocorrelation score or scores, or autocorrelation scores above a threshold. At block 200, terminal 1000, for purposes of calculating a white level of a frame of image data, can discard sampled pixel values other than pixel values of decodable indicia segments of sampling paths having autocorrelation scores previously determined to indicate that a decodable indicia is represented.

At block 200, terminal 1000 can also discard pixel values of sampling paths outside of decodable indicia segments of such paths. For calculation of a white level for a frame, terminal 1000 can selectively utilize pixel data of selected sampling paths within decodable indicia segments of such paths. In one example, CPU 1060 can average pixel values of selected paths with decodable indicia segments of such paths for calculation of white levels. As has been indicated, terminal 1000 can process a frame of image data for determining a quality of a frame. In one example, a white level of a frame can be utilized in determining a quality of a frame. For example, a frame can be determined to be of suitable quality for a decode attempt if a white level of the frame falls within a predetermined range.

A new exposure period parameter determined at block 200 can be calculated using the following formulas:

$$\Delta E = K(W_T - W) \quad \text{Equation 3}$$

$$E_N = E_C + \Delta E \quad \text{Equation 4}$$

where W is the just-measured white level for a frame currently being processed calculated selectively utilizing pixel values within decodable indicia segments of sampling paths indicating that a decodable indicia is represented, $W_T$ is a target white level for a frame, K is a predetermined constant, $\Delta E$ is the change in exposure period, $E_N$ is a new exposure parameter to be applied for capture of a subsequent frame, and $E_C$ is the exposure period parameter for the current frame currently being subject to processing. It should be noted that the applied exposure parameters $E_C$ and $E_N$ may not be applied for capture of successive frames of image data. As has been indicated in connection with the timing diagram of FIG. 6, in many hardware platforms suitable for the operation as described herein, there will be a delay of one or more frame times after an exposure time parameter is applied for capture of a certain frame out of a succession of frames, before that certain frame is stored into memory 1080 where it is addressable for processing by CPU 1060. In typical operation, by application of the described exposure control method, applied exposure parameters for each successive frame can be varied until a frame is successfully decoded or until a trigger signal is manually deactivated. For example, it is seen from the exemplary timing diagram of FIG. 7 that $$\text{Exp}_2 \neq \text{Exp}_3 \neq \text{Exp}_{n-1} \neq \text{Exp}_n \neq \text{Exp}_{n+1}$$

Further referring to the flow diagram of FIG. 1, terminal 1000 at block 300 when utilizing an imaging parameter for capture of a subsequent frame of image data can apply an exposure parameter calculated as described above for capture of a subsequent frame of image data. For capture of a subsequent frame of image data utilizing the new exposure parameter, CPU 1060 can transmit the newly calculated exposure parameter, $E_N$, to timing and control circuit 1038 associated with image sensor 1032 via interface circuit 1028, which in one example can be provided by a PHILLIPS I²C two wire interface bus. Image sensor 1032 can then expose a frame of image data utilizing the exposure period parameter. Where the image sensor 1032 includes a global electronic shutter and the exposure period for each of several rows is initiated and terminated simultaneously, the exposure period parameter can be a frame exposure period. Where image sensor 1032 includes a rolling shutter the exposure parameter applied can be a row exposure period parameter, which can be repeated for each of several rows.

After exposure of image sensor array 1033, image information in the form of voltage signals corresponding to charges stored at the various pixels of image sensor 1032 can be read out of image sensor array 1033 on a row by row basis. The image information can be subject to conversion by A/D converter 1037 and routed to RAM 1080 for completion of capture of a frame of image data by storage into RAM 1080. When stored in RAM 1080 image data is addressable for processing by CPU 1060. Referring again to the flow diagram of FIG. 1, the capture of a subsequent frame utilizing an imaging parameter at block 300 can be regarded as completed by the storage of a subsequent frame of image data into RAM 1080.

Such processing can be carried out within a time period of less than a frame time, even using a CPU having a relatively modest clock speed (in one example, CPU 1060 can be incorporated in an MC9328MXLCVH15 microprocessor IC chip available from Freescale). In one embodiment, terminal 1000 can be adaptable so that processing periods 2126, 2128, 2130, 2132, and 2134 can be restricted from consuming a time period for processing of greater than a predetermined time, e.g., a frame time. In one specific embodiment, with reference to time plot 2122 of FIG. 6, the time periods for processing 2126, 2128, 2130, 2132, and 2134 can be substantially fixed. Where a time period for processing at periods 2126, 2128, 2130, 2132, and 2134 is restricted from consuming a time period greater than a frame time, CPU 1060 can determine a location of a decodable indicia representation in a frame prior to a time that a succeeding frame of image data is available for processing by CPU 1060. In one embodiment, where terminal 1000 has a frame time for a succession of frames of 16.6 ms, terminal 1000 can be operational so that processing periods 2126, 2128, 2130, 2132, 2134 are restricted from consuming a time period of more than 10 ms, and in another embodiment terminal 1000 can be operational so that processing periods

2126, 2128, 2130, 2132, 2134 are restricted from consuming a processing period of more than 5 ms.

Referring again to the flow diagram of FIG. 1, terminal 1000 after block 300 can subject the subsequent frame of image data to various processing, examples of which are described herein. In some embodiments, the processing which the subsequent frame is subject to can be related to the order of the frame. In some embodiments, terminal 1000 can be configured to avoid attempting to decode a first predetermined number of frames and in other embodiments, terminal 1000 can be configured to attempt to decode a frame conditionally on the condition that the frame passes a test for quality (e.g., a white level within a certain range). For some scenes in such embodiments, a number of frames may be subject to processing as described in connection with blocks 100 and 200 before a frame is captured that is subject to a decode attempt either by qualification by frame number or by quality measurement. In other embodiments, every frame of a succession of frames e.g., $frame_0$, $frame_1 \ldots$, $frame_{n+1} \ldots$, can be subject to an attempt to decode. It is seen that where a subsequent frame is not subject to a decode attempt (e.g., only subject to context detection and to parameter and quality determination), a further subsequent frame (e.g., $frame_{R+S}$, $s \geq 1$ where $frame_R$ is the subsequent frame) may be subject to a decode attempt (e.g., where $frame_{R+S}$ passes a quality test). In such an example, subsequent $frame_R$, as well as the frame subject to processing for determining an imaging parameter yielding the subsequent frame, may be frames in a succession of frames that are of continually improving quality as a result of imaging parameters being calculated according to Equations 3 and 4 and applied to image sensor 1032.

CPU 1060, appropriately programmed can carry out a decoding process for attempting to decode a frame of image data. For attempting to decode, CPU 1060 can sample image data of a captured frame of image data along a sampling path, e.g., at a center of a frame, or a coordinate location determined to include a decodable indicia representation. In one example, a sampling path selected for executing a decode attempt can be a sampling path which for a previous frame was determined to intersect a decodable indicia representation. Next, CPU 1060 can perform a second derivative edge detection to detect edges. After completing edge detection, CPU 1060 can determine data indicating widths between edges. CPU 1060 can then search for start/stop character element sequences and if found, derive element sequence characters character by character by comparing with a character set table. For certain symbologies, CPU 1060 can also perform a checksum computation. If CPU 1060 successfully determines all characters between a start/stop character sequence and successfully calculates a checksum (if applicable), CPU 1060 can output a decoded message. Where a decodable indicia representation is a 2D bar code symbology, a decode attempt can comprise the steps of locating a finder pattern using a feature detection algorithm, locating scan lines intersecting the finder pattern according to a predetermined relationship with the finder pattern, determining a pattern of dark and light cells along the scan lines, and converting each light pattern into a character or character string via table lookup.

In one embodiment, terminal 1000 can incorporate a multitasking operating system, and CPU 1060 can be programmed to contemporaneously execute, as part of separate processing threads, the described (a) context detection and parameter (and possibly quality determination) processing and (b) decoding processing. However, whereas terminal 1000 can be adapted so that context detection and parameter and quality determination processing is restricted from consuming more than one frame time, decoding processing for attempting to extract a decoded message can, in one embodiment, consume more than one frame time. Accordingly, at a time CPU 1060 commences processing of a certain frame, $frame=frame_j$ for context detection and parameter and quality determination, CPU 1060 may be processing a previous frame, $frame_{j-k}$, $k \geq 1$ for decoding. Referring to the timing diagram of FIG. 6, CPU 1060 can, in accordance with a first thread, be subjecting frame, to context detection and parameter and quality determination processing, while CPU 1060 in accordance with a second thread at overlapping period 2144, can be processing $frame_{n-1}$ for attempting to decode.

In one embodiment, terminal 1000 can be adapted to avoid subjecting a frame of image data to a decode attempt unless the frame is determined to be of suitable quality for a decode attempt. Referring again to the timing diagram of FIG. 6, in which a specific example is illustrated, CPU 1060 may not commence decoding processing, in accordance with a decode processing thread at decode attempt processing period 2144 with respect to $frame_{n-1}$, until $frame_{n-1}$ is determined to be of suitable quality for a decode attempt as a result of processing occurring during processing period 2132.

In another embodiment, CPU 1060 can be adapted so that CPU 1060 ceases decoding a frame presently being subject to decoding, and commences decoding a more recently captured frame conditionally on a result of processing of the more recent frame at blocks 100 and 200. In another embodiment, CPU 1060 can be adapted to subject each newly stored frame to a decode attempt. Also, terminal 1000 can be programmed so that after imaging parameters are developed pursuant to context detection having certain characteristics, an acquired frame acquired using the imaging parameter is automatically subject to decoding without being subject to context detection. Accordingly, it is observed that processing after block 300 can include one or more of (a) subjecting the subsequent frame to context detection processing and/or parameter determination for utilization in capture of a subsequent frame and/or determining frame quality; and (b) subjecting the subsequent frame to a decode attempt.

While the present invention has been described with reference to a number of specific embodiments, numerous variations are possible. For example, at block 100, CPU 1060, rather than processing sampling path data for context detection of a frame can apply a texture filter set, e.g., a set such as:

$$\begin{bmatrix} 1 & 1 \\ -1 & -1 \end{bmatrix} \begin{bmatrix} -1 & 1 \\ -1 & 1 \end{bmatrix} \begin{bmatrix} 1 & 1 \\ -1 & 1 \end{bmatrix} \begin{bmatrix} 1 & 1 \\ 1 & -1 \end{bmatrix} \begin{bmatrix} 1 & -1 \\ 1 & 1 \end{bmatrix} \begin{bmatrix} -1 & 1 \\ 1 & 1 \end{bmatrix}$$

Figure 8:
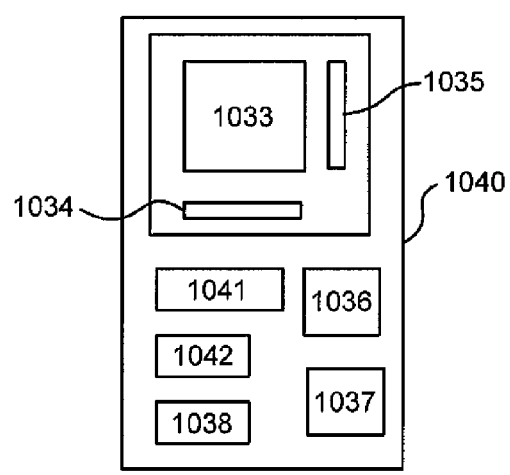
FIG. 8 is a block diagram including an alternative image sensor integrated circuit.

For performance of context detection, texture filter statistics can be examined for determining the existence of and a location of a decodable indicia representation. For example, where vertical and horizontal edges and density exceeds a predetermined threshold, CPU 1060 can determine that a linear bar code symbol is represented in image data. Furthermore, texture filters need not be applied by CPU 1060 with reference to stored frames of image data. For example, as shown in FIG. 8, image sensor integrated circuit 1040 can be modified to include N row buffer 1041 and N×N mask filter circuit 1042. Filters can be applied to image data as it is read out of integrated circuit 1040, the results can be accumulated, and data indicating the location of decodable indicia representation can be reported in a reference data location (e.g., a header or footer) of each frame. In such an embodiment, processing of image information for detecting a location of a decodable indicia can be carried out by circuitry of terminal 1000 other than CPU 1060 prior to storage of a frame of image data into RAM 1080. The processing required by CPU 1060 in such an embodiment for determining a location of decodable indicia in each frame can comprise reading of the data of the reference data location, which processing requires a processing time of only a fraction of a frame time.

Figure 9:
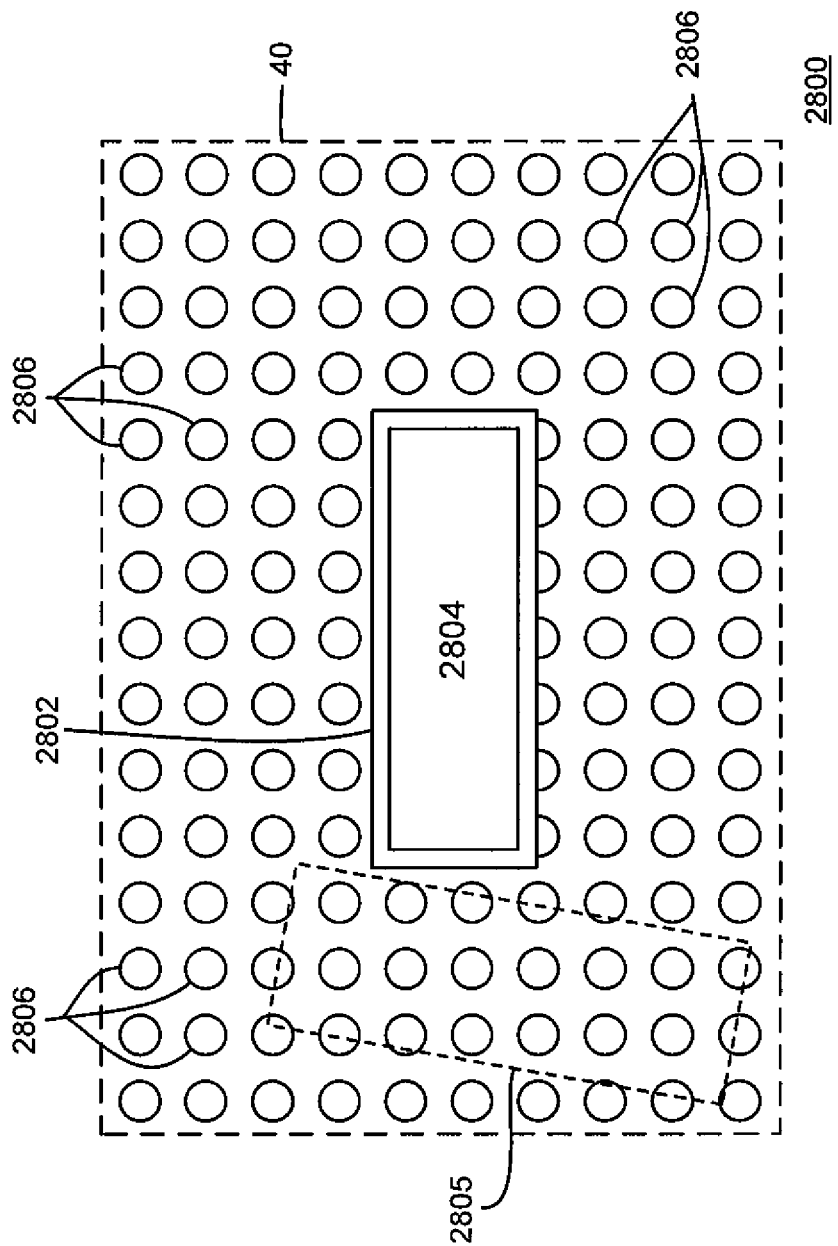
FIG. 9 is a diagram illustrating an exemplary scene condition under which a terminal operable according to a described method can successfully read a decodable indicia.

The method as described herein allows for reading of a decodable indicia in an expanded range of scene conditions. In the example of FIG. 9, a scene 2800 includes an array of energized red light emitting diodes (LEDs) 2806. Red LEDs 2806 can be arranged such that primary emission vectors of LEDs 2806 are directed generally toward a receive imaging path of an indicia reading terminal 1000 (not shown in FIG. 9) held in a position above scene 2800, such that the LED array comprising LEDs 2806 substantially spans an entirety of a field of view 40 of terminal 1000. In the example of FIG. 9, the energized red LED array comprises a 15×10 array of red light emitting LEDs, each energized to emit at about 800 MCD of luminous intensity. Further according to the described example of FIG. 9, a non-light transmissive substrate carrying decodable indicia 2804 can be disposed over a portion of the LED array as shown within a field of view 40 such that substrate 2802 encompasses less than 25% of the field of view 40. In such an example, terminal 1000, operating according to a described method can be operative to decode decodable indicia 2804, without the light emitted from LEDs 2806 causing a failure to read.

By operating according to a described method, terminal 1000 can utilize a determined location of a decodable indicia representation for capture of a frame that can be successfully decoded. In a specific example, by operating according to a described method, a portion of an image representation corresponding to decodable indicia 2804 (e.g., a bar code symbol, and OCR characters) can be detected as a decodable indicia representation, pixel values corresponding to indicia 2804 can be utilized for parameter determination for capture of a subsequent frame, and the subsequent frame (or further subsequent frame after one or more iterations of the method) can be subject to a successful decode attempt for decoding of decodable indicia 2302. By contrast, by a process according to a commercially available terminal, the terminal will attempt to set imaging parameters using image data corresponding to energized LEDs 2806, which imaging parameters will not produce image data corresponding to the area of indicia 2804 that is of sufficient quality for decoding. Further according to the described example, terminal 1000 operable according to described method can be operable to decode decodable indicia 2804 irrespective of a position of indicia 2804 within field of view 40. That is, terminal 1000 operational according to a described method can successfully decode decodable indicia 2804 when decodable indicia 2804 is disposed at an arbitrary position within field of view 40. For example, if substrate 2802 is moved to position 2805, terminal 1000 operable according to a described method can utilize pixel values corresponding to the area of position 2805 for determining an imaging parameter, and can subject a subsequent frame captured utilizing the imaging parameter (or a further subsequent frame captured after one or more iterations) to a successful decode attempt.

A small sample of systems methods and apparatus that are described herein is as follows:

A1. A method for operating an indicia reading terminal for decoding of a decodable indicia, said indicia reading terminal including an image sensor and an imaging lens assembly for focusing of an image of said decodable indicia onto said image sensor, said indicia reading terminal being operative to capture at a frame rate a succession of frames of image data, said method comprising the steps of:
(a) processing image information to determine a location of a decodable image representation in a certain frame of image data;
(b) determining an imaging parameter utilizing a result of said processing step (a); and
(c) utilizing said imaging parameter determined at step (b), capturing a subsequent frame of image data.

A2. The method of claim A1, wherein said processing step (a) includes the step of storing a frame of image data into a CPU addressable memory.

A3. The method of claim A1, wherein said processing step (a) includes the step of sampling image data along a plurality of sampling paths.

A4. The method of claim A1, wherein said processing step (a) includes the step of sampling image data along one or more of a plurality of horizontal sampling paths and a plurality of vertical sampling paths.

A5. The method of claim A1, wherein said processing step (a) includes the step of calculating an autocorrelation score for a sampling path.

A6. The method of claim A1, wherein said processing step (a) includes selecting among the highest autocorrelation scores for a plurality of sampling paths.

A7. The method of claim A1, wherein said processing step (a) is initiated responsively to an operator actuating a trigger of said indicia reading terminal.

A8. The method of claim A1, wherein said processing step (a) includes the step of determining a plurality of locations including decodable indicia representations.

A9. The method of claim A1, wherein said determining step (b) includes determining an exposure period parameter.

A10. The method of claim A1, wherein said determining step (b) includes selectively utilizing image data at a location of said certain frame determined to include a decodable indicia representation.

A11. The method of claim A1, wherein responsively to a trigger signal being made active by actuation of a trigger, said indicia reader captures a plurality of frames of image data including said certain frame and said subsequent frame, and wherein said certain frame and said subsequent frame are not successive frames.

A12. The method of claim A1, wherein said processing step (a) includes processing completed prior to storage of said certain frame of image data into a CPU addressable memory.

A13. The method of claim A1, wherein said method further includes the step of subjecting said subsequent frame to context detection.

A14. The method of claim A1, wherein said method further includes the step of subjecting said subsequent frame to processing for parameter determination.

A15. The method of claim A1, wherein said method further includes the step of subjecting at least one of said subsequent frame or a further subsequent frame to a decode attempt for decoding of decodable indicia.

A16. The method of claim A1, wherein said method further includes the steps of repeating steps (a), (b), and (c) for a plurality of frames of image data so that a plurality of subsequent frames are captured, and subjecting at least one said subsequent frame of image data to a decode attempt.

B1. A hand held indicia reading terminal for reading of a decodable indicia, said hand held indicia reading terminal comprising:
an image sensor;

an optics assembly focusing an image of said decodable indicia onto said image sensor;

a hand held housing encapsulating said image sensor, said hand held indicia reading terminal being adapted to capture a succession of frames of image data according to a frame rate such that each frame of said succession of captured frames is captured within a frame time;

a trigger disposed on said hand held housing for initiation of an indicia decode attempt;

wherein said hand held indicia reading terminal is operative for (a) processing a certain frame of a succession of frames for a period of less than said frame time for determining a location of a decodable indicia representation in said certain frame;

wherein said hand held indicia reading terminal is further operative for (b) utilizing a result of said processing (a) for determining an imaging parameter; and wherein said hand held indicia reading terminal is further operative for (c) utilizing said imaging parameter for capturing of a subsequent frame of image data.

B2. The hand held indicia reading terminal of claim B1, wherein said processing (a) includes reading location data from a frame reference data location.

B3. The hand held indicia reading terminal of claim B1, wherein said processing (a) includes applying texture filters to said certain frame.

B4. The hand held indicia reading terminal of claim B1, wherein said processing (a) includes processing data along sampling paths of said certain frame.

C1. A hand held indicia reading terminal for reading of a decodable indicia, said hand held indicia reading terminal comprising:

a two dimensional image sensor having a plurality of pixels arranged in columns and rows of pixels;

an optics assembly focusing an image of said decodable indicia onto said two dimensional image sensor;

a memory;

a central processing unit (CPU);

a trigger disposed on said hand held housing for initiation of an indicia decode attempt;

wherein said hand held indicia reading terminal is operative so that subsequent to said trigger being actuated, said hand held indicia reading terminal stores into said memory a succession of frames of image data for processing by said CPU, wherein said hand held indicia reading terminal is further operative so that said succession of frames are captured according to frame rate such that each of said frames of image data is captured within a frame time;

wherein said hand held indicia reading terminal is further operative so that subsequent to said trigger being actuated, said CPU subjects each of a plurality of said succession of frames to processing that includes determining a location of a decodable indicia representation in a frame of image data, and utilizing a result of said location determining for determining an imaging parameter for use in capture of a subsequent frame.

C2. The hand held indicia reading terminal of claim C1, wherein said hand held indicia reading terminal is operative so that said processing by said CPU for each of said plurality of frames including processing for determining a location of a decodable indicia representation and utilizing a result of said location determining for determining an imaging parameter is restricted from consuming a time period for processing of greater than said frame time.

D1. A hand held indicia reading terminal for reading of a decodable indicia, said hand held indicia reading terminal comprising:

an image sensor;

an optics assembly focusing an image of said decodable indicia onto said image sensor;

a hand held housing encapsulating said image sensor, said hand held indicia reading terminal being adapted to capture a succession of frames of image data;

wherein said indicia reading terminal is operative to utilize a determined location of a decodable indicia representation corresponding to said decodable indicia for frame capture so that said indicia reading terminal is capable of successfully decoding a decodable indicia disposed in a scene within a field of view of said indicia reading terminal, wherein said scene includes an energized red LED array substantially spanning said field of view, and a non-light transmissive substrate carrying said decodable indicia disposed over said red LED array at an arbitrary position over said red LED array within said field of view such that said non-light transmissive substrate encompasses less than 25% of said field of view, and a remaining portion of said field of view corresponds to said red LED array.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements.

The invention claimed is:

1. A method for operating an indicia reading terminal for decoding of a decodable indicia, said indicia reading terminal including an image sensor and an imaging lens assembly for focusing of an image of said decodable indicia onto said image sensor, said indicia reading terminal being operative to capture at a frame rate a succession of frames of image data, said method comprising the steps of:
   (a) processing image information to determine a location of a decodable indicia representation in a certain frame of image data;
   (b) determining one or more imaging parameter selectively utilizing frame image data corresponding to said location determined, via the processing image information, to be a location of a decodable indicia representation, wherein said one or more imaging parameter includes an imaging parameter of an imaging parameter type selected from the group consisting of an exposure period parameter, a gain parameter, and an illumination level parameter; wherein the processing referred to in step (a) and the determining referred to in step (b) are performed during a common trigger signal activation period, and
   (c) utilizing said one or more imaging parameter determined at step (b), capturing a subsequent frame of image data.

2. The method of claim 1, wherein said processing step (a) includes the step of storing a frame of image data into a CPU addressable memory.

3. The method of claim 1, wherein said processing step (a) includes the step of sampling image data along a plurality of sampling paths.

4. The method of claim 1, wherein said processing step (a) includes the step of sampling image data along one or more of a plurality of horizontal sampling paths and a plurality of vertical sampling paths.

5. The method of claim 1, wherein said processing step (a) includes the step of calculating an autocorrelation score for a sampling path.

6. The method of claim 1, wherein said processing step (a) includes selecting among the highest autocorrelation scores for a plurality of sampling paths.

7. The method of claim 1, wherein said processing step (a) is initiated responsively to an operator actuating a trigger of said indicia reading terminal.

8. The method of claim 1, wherein said processing step (a) includes the step of determining a plurality of locations including decodable indicia representations.

9. The method of claim 1, wherein said determining step (b) includes determining an exposure period parameter.

10. The method of claim 1, wherein said determining step (b) includes selectively utilizing image data at a location of said certain frame determined to include a decodable indicia representation.

11. The method of claim 1, wherein responsively to a trigger signal being made active by actuation of a trigger, said indicia reader captures a plurality of frames of image data including said certain frame and said subsequent frame, and wherein said certain frame and said subsequent frame are not successive frames.

12. The method of claim 1, wherein said processing step (a) includes processing completed prior to storage of said certain frame of image data into a CPU addressable memory.

13. The method of claim 1, wherein said method further includes the step of subjecting said subsequent frame to context detection.

14. The method of claim 1, wherein said method further includes the step of subjecting said subsequent frame to processing for parameter determination.

15. The method of claim 1, wherein said method further includes the step of subjecting at least one of said subsequent frame or a further subsequent frame to a decode attempt for decoding of decodable indicia.

16. The method of claim 1, wherein said method further includes the steps of repeating steps (a), (b), and (c) for a plurality of frames of image data so that a plurality of subsequent frames are captured, and subjecting at least one said subsequent frame of image data to a decode attempt.

17. The method of claim 1, wherein said selectively utilizing frame image data includes discarding image data not of a decodable indicia representation.

18. A hand held indicia reading terminal for reading of a decodable indicia, said hand held indicia reading terminal comprising:
an image sensor;
an optics assembly focusing an image of said decodable indicia onto said image sensor;
a hand held housing encapsulating said image sensor, said hand held indicia reading terminal being adapted to capture a succession of frames of image data according to a frame rate such that each frame of said succession of captured frames is captured within a frame time;
a trigger disposed on said hand held housing for initiation of an indicia decode attempt;
wherein said hand held indicia reading terminal is operative for (a) processing a certain frame of a succession of frames for a period of less than said frame time for determining a location of a decodable indicia representation in said certain frame;
wherein said hand held indicia reading terminal is further operative for (b) selectively utilizing frame image data corresponding to said location determined, via the processing a certain frame, to be a location of a decodable indicia representation for determining one or more imaging parameter, said one or more imaging parameter including an imaging parameter of an imaging parameter type selected from the group consisting of an exposure period parameter, a gain parameter, and an illumination level parameter, wherein the processing and the selectively utilizing are performed during a common trigger signal activation period, and
wherein said hand held indicia reading terminal is further operative for (c) utilizing said one or more imaging parameter for capturing of a subsequent frame of image data.

19. The hand held indicia reading terminal of claim 18, wherein said processing (a) includes reading location data from a frame reference data location.

20. The hand held indicia reading terminal of claim 18, wherein said processing (a) includes applying texture filters to said certain frame.

21. The hand held indicia reading terminal of claim 18, wherein said processing (a) includes processing data along sampling paths of said certain frame.

22. The hand held indicia reading terminal of claim 18, wherein the one or more imaging parameter includes an exposure period parameter.

23. The hand held indicia reading terminal of claim 18, wherein the one or more imaging parameter includes a gain parameter.

24. The hand held indicia reading terminal of claim 18, wherein the one or more imaging parameter includes an illumination level parameter.

25. A hand held indicia reading terminal for reading of a decodable indicia, said hand held indicia reading terminal comprising:
a two dimensional image sensor having a plurality of pixels arranged in columns and rows of pixels;
an optics assembly focusing an image of said decodable indicia onto said two dimensional image sensor;
a memory;
a central processing unit (CPU);
a trigger disposed on said hand held housing for initiation of an indicia decode attempt;
wherein said hand held indicia reading terminal is operative so that subsequent to said trigger being actuated, said hand held indicia reading terminal stores into said memory a succession of frames of image data for processing by said CPU, wherein said hand held indicia reading terminal is further operative so that said succession of frames are captured according to frame rate such that each of said frames of image data is captured within a frame time;
wherein said hand held indicia reading terminal is further operative so that subsequent to said trigger being actuated, said CPU subjects each of a plurality of said succession of frames to image data processing that includes determining a location of a decodable indicia representation in a frame of image data, and selectively utilizing frame image data corresponding to said location determined, via the image data processing, be a location of a decodable indicia representation for determining one or more imaging parameter for use in capture of a subsequent frame, wherein said one or more imaging parameter includes an imaging parameter of an imaging parameter type selected from the group consisting of an exposure period parameter, a gain parameter, and an illumination level parameter, wherein the hand held indicia reading terminal is further operative so that the determining and the selectively utilizing are performed during a common trigger signal activation period.

26. The hand held indicia reading terminal of claim 25, wherein said hand held indicia reading terminal is operative so that said processing by said CPU for each of said plurality of frames including processing for determining a location of a decodable indicia representation and utilizing a result of said location determining for determining an imaging parameter is restricted from consuming a time period for processing of greater than said frame time.

27. A hand held indicia reading terminal for reading of a decodable indicia, said hand held indicia reading terminal comprising:
- an image sensor;
- an optics assembly focusing an image of said decodable indicia onto said image sensor;
- a hand held housing encapsulating said image sensor, said hand held indicia reading terminal being adapted to capture a succession of frames of image data;

wherein said indicia reading terminal is operative to utilize a determined location of a decodable indicia representation corresponding to said decodable indicia for frame capture so that said indicia reading terminal is capable of successfully decoding a decodable indicia disposed in a scene within a field of view of said indicia reading terminal, wherein said scene includes an energized red LED array substantially spanning said field of view, and a non-light transmissive substrate carrying said decodable indicia disposed over said red LED array at an arbitrary position over said red LED array within said field of view such that said non-light transmissive substrate encompasses less than 25% of said field of view, and a remaining portion of said field of view corresponds to said red LED array.

* * * * *